US006790809B2

(12) United States Patent
Suzuki

(10) Patent No.: US 6,790,809 B2
(45) Date of Patent: Sep. 14, 2004

(54) HEAT-RESPONSIVE-DISCOLORING COLORING COMPOSITION, HEAT-RESPONSIVE-DISCOLORING COLORING ELEMENT COMPRISING SAME AND METHOD FOR DETECTING THERMAL HISTORY OF ARTICLE

(75) Inventor: Keiichi Suzuki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 214 days.

(21) Appl. No.: 10/219,486

(22) Filed: Aug. 16, 2002

(65) Prior Publication Data

US 2003/0064890 A1 Apr. 3, 2003

(30) Foreign Application Priority Data

Aug. 21, 2001 (JP) ....................................... 2001-250438

(51) Int. Cl.$^7$ ........................... B41M 5/00; B41M 5/30; C08K 5/13; G03C 1/73; C08L 10/12

(52) U.S. Cl. ....................... 503/201; 503/207; 503/208; 503/214; 430/339; 430/964

(58) Field of Search ................................. 503/201, 207, 503/208, 214; 430/339, 964

(56) References Cited

U.S. PATENT DOCUMENTS

| | | | | |
|---|---|---|---|---|
| 3,476,937 | A | * | 11/1969 | Vrancken |
| 3,769,019 | A | * | 10/1973 | Wlese et al. |
| 4,004,924 | A | * | 1/1977 | Vrancken et al. |
| 6,455,210 | B1 | * | 9/2002 | Irving et al. |

* cited by examiner

*Primary Examiner*—Richard L. Schilling
(74) *Attorney, Agent, or Firm*—Sughrue Mion, PLLC

(57) ABSTRACT

A heat-responsive-discoloring coloring composition, which is colored at a temperature lower than its discoloration initiation temperature (T) of 60° C. to 200° C.; which is substantially discolored at a temperature equal to or higher than the discoloration initiation temperature (T); and which does not recover its color once discolored, even when its temperature is lowered to a temperature lower than the discoloration initiation temperature (T) again, the heat-responsive-discoloring coloring composition comprising a polymer having a glass transition temperature (Tg) of 60° C. to 200° C.

12 Claims, No Drawings

HEAT-RESPONSIVE-DISCOLORING COLORING COMPOSITION, HEAT-RESPONSIVE-DISCOLORING COLORING ELEMENT COMPRISING SAME AND METHOD FOR DETECTING THERMAL HISTORY OF ARTICLE

FIELD OF THE INVENTION

The present invention relates to a heat-responsive-discoloring coloring composition capable of providing prints recyclable by heat treatment and thus suitable for detecting the thermal history of such articles as electronic appliances, food, etc., and a heat-responsive-discoloring coloring element and a method for detecting the thermal history of an article using such a heat-responsive-discoloring coloring composition or element.

BACKGROUND OF THE INVENTION

With OA equipment widely spreading and information technology (IT) rapidly progressing in recent years, offices are flooded with papers, causing serious social problems in the treatment of waste papers increased accordingly. Also, attention is paid to environmental problems of the conservation of forest resources, etc. Against such backdrop, development is actively carried out particularly to provide the technologies of recycling copy papers, and hydrolyzable toners, toners decolored by light, etc. are disclosed in JP 7-120975 A, JP 7-301952 A, etc. Also, toners discolored by heating are described in Takayama, et al "Polymer Preprints, Japan" Vol. 47, No. 9 (1998), page 2063, etc. Further proposed is a method for discoloration of coloring components comprising an electron-donating, organic color former and a phenolic material or another acidic material by heating together with a decoloring agent (JP 57-59079 B, etc.). Though various discoloration methods are proposed, dry treatment is preferable for the simplicity of treatment.

With respect to discoloration by dry treatment, several methods were proposed, and main methods among them are;

(1) Methods using heat-decolorable dyes (U.S. Pat. Nos. 3,769,019, 3,821,001, 4,033,948, 4,088,497, 4,153,463 and 4,283,487, JP 52-139136 A, JP 53-132334 A, JP 54-56818 A, JP 57-16060 A and JP 59-182436A, etc.), or dyes decolored by corrosive gases generated from counter salts while heating (U.S. Pat. No. 4,347,401, etc.);

(2) Methods for discoloration when heated in the presence of agents for generating carbanions by heat and dyes (U.S. Pat. Nos. 5,135,842, 5,258,274, 5,314,795, 5,324,627 and 5,384,237, European Patent 605286, JP 6-222504 A and JP 7-199409 A);

(3) Methods using dyes comprising leuco dyes and acids vaporizable or decomposable by heating for generating a color-developed state by their combination (JP 10-16410 A and JP 10-287055 A);

(4) Methods using dyes discolored by light, such as an o-nitroarylidene dye or an o-nitro-o-azarylidene dye (U.S. Pat. No. 3,984,248 and JP 54-17833 A), dyes having cleavable N—O bonds (U.S. Pat. No. 3,770,451), chrominium-type cyanine dyes (JP 2-229864 A), anionic dyes containing iodonium salts as counter ions (JP 59-164549 A), etc.; and (5) Methods using (a) photosensitive halogen-containing compounds (JP 57-20734 A and JP 57-68831 A), azide compounds (JP 63-146028 A), ketone-based sensitizing compounds (JP 50-10618 A), mesoionic compounds (U.S. Pat. No. 4,548,895) or iodonium compounds (U.S. Pat. No. 4,701,402), and (b) dyes which are decolored by reaction with active species generated by irradiating and/or heating the above compounds, or by interaction with the above compounds in excited states.

The above methods (1) to (3) are easy because discoloration occurs when heated. However, a discoloration reaction is likely to occur during storage in these methods, failing to exhibit functions when necessary. It has also been found that in a case where a reaction accompanied with gas generation at the time of heating is used, the gas likely forms bubbles, resulting in image defects.

The methods (4) and (5), in which discoloration occurs by light irradiation, are free from the above problems. However, because a large amount of irradiation rays are needed for discoloration in these methods, photo-discoloration is likely to occur, and it takes much time for the treatment.

OBJECT OF THE INVENTION

Accordingly, an object of the present invention is to solve the problems of the above prior art technologies, thereby providing a heat-responsive-discoloring coloring composition that is easily discolored or decolored by a dry treatment, and a heat-responsive-discoloring coloring element comprising a heat-responsive-discoloring coloring layer containing such a heat-responsive-discoloring coloring composition, and further a method for detecting the thermal history of an article using such a heat-responsive-discoloring coloring composition or such a heat-responsive-discoloring coloring element.

SUMMARY OF THE INVENTION

As a result of intensive research in view of the above object, the inventor has found that by adding a polymer having a glass transition temperature (Tg) of 60° C. to 200° C. to a discoloring coloring composition, it is possible to obtain a heat-responsive-discoloring coloring composition, which is colored at a temperature lower than its discoloration initiation temperature (T) of 60° C. to 200° C. and substantially discolored at a temperature equal to or higher than the discoloration initiation temperature (T), and which does not recover its color once discolored, even when its temperature is lowered to a temperature lower than the discoloration initiation temperature (T) again. The present invention has been completed based on this finding.

Thus, the heat-responsive-discoloring coloring composition of the present invention is colored at a temperature lower than its discoloration initiation temperature (T) and substantially discolored at a temperature equal to or higher than the discoloration initiation temperature (T), and does not recover its color once discolored, even when its temperature is lowered to a temperature lower than the discoloration initiation temperature (T) again, the discoloration initiation temperature (T) being 60° C. to 200° C., and the heat-responsive-discoloring coloring composition comprising a polymer having a glass transition temperature (Tg) of 60° C. to 200° C.

The heat-responsive-discoloring coloring composition of the present invention preferably comprises at least an electron-donating, organic color former (coloring compound) and an acidic compound. The acidic compound is preferably a phenol compound. The heat-responsive-discoloring coloring composition of the present invention preferably contains a hydrophilic binder. The above polymer is preferably in the form of dispersed particles having an average particle size of 0.01 $\mu$m to 1 $\mu$m.

The heat-responsive-discoloring coloring element of the present invention comprises a substrate and a heat-responsive-discoloring coloring layer coated on the substrate, the heat-responsive-discoloring coloring layer comprising the above heat-responsive-discoloring coloring composition.

A method for detecting the thermal history of an article according to the present invention comprises the steps of applying the above heat-responsive-discoloring coloring composition to the article, and measuring the color concentration of the heat-responsive-discoloring coloring composition to detect the thermal history of the article. Another method for detecting the thermal history of an article according to the present invention comprises the steps of positioning the above heat-responsive-discoloring coloring element near the article, and measuring the color concentration of the heat-responsive-discoloring coloring composition to detect the thermal history of the article.

DETAILED DESCRIPTION OF THE PREFERRED EMBODIMENTS

The heat-responsive-discoloring coloring composition of the present invention is in a colored state at 25° C., while it is irreversibly discolored at a temperature equal to or higher than the discoloration initiation temperature (T), which is 60° C. to 200° C., and it contains a polymer having a glass transition temperature (Tg) of 60° C. to 200° C. Detailed explanation will be made below with respect to the heat-responsive-discoloring coloring composition of the present invention, and a heat-responsive-discoloring coloring element and a method for detecting the thermal history of an article using the heat-responsive-discoloring coloring composition.

The "discoloration initiation temperature (T)" is defined herein as a temperature at which the heat-responsive-discoloring coloring composition reaches a middle concentration between a color concentration at 25° C. and a minimum color concentration (equilibrium color concentration), which would not decrease even with further temperature elevation. Specifically, the discoloration initiation temperature (T) is a temperature at which a light absorption ratio of the maximum absorption wavelength in the visible wavelength range (400 nm to 700 nm) is just middle between the light absorption ratio at 25° C. and the light absorption ratio in the minimum color concentration state. The term "discolored" used herein means that a coloring composition loses its color to an extent that its color concentration becomes 40% or less of that at 25° C. The term "does not recover its color" used herein means that even when it is lowered to a temperature lower than the discoloration initiation temperature (T) again after discolored, the color concentration does not return to more than 40% of that at 25° C. The term "heat-responsive-discoloring" means that the coloring composition is discolored in response to heat.

[1] Heat-responsive-discoloring Coloring Composition

The heat-responsive-discoloring coloring composition indispensably comprises a polymer having a glass transition temperature (Tg) of 60° C. to 200° C. The polymer is preferably in the form of dispersed particles having an average particle size of 0.01 μm to 1 μm. The heat-responsive-discoloring coloring composition preferably comprises at least an electron-donating, organic color former and an acidic compound. The acidic compound is preferably a phenol compound. The heat-responsive-discoloring coloring composition may further comprise a decoloring agent.

(A) Polymer

When the heat-responsive-discoloring coloring composition is heated to temperatures equal to or higher than the glass transition temperature (Tg) of the polymer, the polymer hinders interaction between the electron-donating color former and the color-developing agent, resulting in discoloration. Even when the discolored coloring composition is cooled to lower temperatures than the Tg again, the coloring composition does not recover its color, because the interaction between the electron-donating color former and the color-developing agent remains hindered because of the solidification of the polymer having Tg of 60° C. to 200° C. Thus, the polymer used in the present invention has a function to fix the reversible change of discoloration and color development by the electron-donating color former and the color-developing agent on the side of discoloration, namely to keep a discolored state. To exhibit this function effectively, the polymer preferably has a glass transition temperature (Tg) lower than a treatment temperature, more preferably as close to it as possible. Specifically a polymer having Tg of 60° C. to 200° C. is used.

The polymer itself may function as a decoloring agent. In this case, because the polymer should keep a dispersed state before temperature elevation, the polymer is preferably in the form of dispersed particles, namely a polymer latex. The term "polymer latex" used herein means a dispersion obtained by dispersing a hydrophobic polymer insoluble in water as fine particles in an aqueous medium. The dispersed state may be any one of a state in which the polymer is emulsified in a dispersion medium, a state obtained by emulsion polymerization, a state obtained by micelle dispersion, a state in which the molecular chains of a polymer partially having a hydrophilic structure are dispersed on a molecule level, etc. The dispersed state is preferably a state in which the polymer is emulsified in a dispersion medium, a state obtained by emulsion polymerization, and a state in which the molecular chains of a polymer partially having a hydrophilic structure are dispersed on a molecule level, more preferably a state obtained by emulsion polymerization. The details of the polymer latex are described in Taira Okuda and Kan Inagaki, "Synthetic Resin Emulsion," issued by Kobunshi Kankokai, 1978; Soichi Muroi, "Chemistry of High-Molecular Latex," issued by Kobunshi Kankokai, 1970; etc.

Examples of polymers used in the polymer latex include acrylic resins, vinyl chloride resins, vinylidene chloride resins, polyolefin resins, condensed polymer resins such as polyurethane resins, polyester resins, polyamide resins, polyurea resins and polycarbonate resins, and copolymers thereof. Preferable among them are acrylic resins, vinyl chloride resins, vinylidene chloride resins, polyolefin resins and copolymers thereof, more preferably acrylic resins.

The polymer may be any of linear, branched or cross-linked polymers. It may be a homopolymer constituted by a single type of repeating units, or a copolymer constituted by plural types of repeating units. The number-average molecular weight of the polymer is advantageously 5,000 to 1,000,000, more advantageously 10,000 to 100,000. When the number-average molecular weight is less than 5,000, a coloring layer made of the heat-responsive-discoloring composition of the present invention tends to have insufficient strength. On the other hand, when it is more than 100,000, the heat-responsive-discoloring composition is likely to have poor film-forming properties, causing the problem of poor ejectability when used for ink.

An average particle size of fine polymer particles in the polymer latex is preferably 0.01 to 1 μm, more preferably 0.01 to 0.5 μm, most preferably 0.02 to 0.3 μm. The particle size distribution of the fine polymer particles is not particularly limited, and either of those having a wide particle size distribution and those having a single-dispersion particle size distribution may be used.

The polymer particles in the polymer latex have a glass transition temperature (Tg) of 60° C. to 200° C., preferably 90° C. to 150° C. Tg can be measured by a differential-scanning calorimeter (DSC). Specifically, 10 mg of a sample is heated to 300° C. at a temperature elevation speed of 20° C./minute in a nitrogen stream, quenched to room temperature, and heated again at a temperature elevation speed of 20° C./minute, to measure a temperature at which a DSC curve starts to deviate from a base line and a temperature at which the DSC returns to a new base line temperature, the above two temperatures being arithmetically averaged to obtain Tg.

The polymer latex may be substantially uniform in an entire composition, or may be a so-called core/shell-type latex having different compositions in a center portion and an outer portion. To fully exhibit properties, the core/shell-type latex preferably has different Tg or degree of cross-linking in a core portion and a shell portion.

When their Tg is different, the difference in Tg between the core portion and the shell portion is preferably 30° C. or more. Though the core portion may have higher or lower Tg than that of the shell portion, it is preferable that the core portion has lower Tg than that of the shell portion. The core portion has Tg of preferably 60° C. to 200° C., more preferably 90° C. to 150° C. To provide the core portion and the shell portion with different Tg, different resins may be used for the core portion and the shell portion.

When the core portion and the shell portion have different degrees of cross-linking, it is preferable that one is cross-linked, while the other is not cross-linked, and it is more preferable that the core portion is cross-linked, while the shell portion is not cross-linked. Though monomers constituting the core portion and the shell portion may be at any weight ratio, the monomer weight ratio of the core portion to the shell portion is preferably 20/80 to 80/20, more preferably 50/50 to 70/30 for good film-forming properties.

Explained below as an example is a vinyl polymer latex. The polymer may be a homopolymer of any monomer selected from monomers exemplified below or a copolymer of arbitrarily combined monomers. There are no particular restrictions in usable monomer units, and any monomers can be used as long as they are polymerizable by usual radical polymerization methods.

(a) Monomers (1) Olefins: ethylene, propylene, isoprene, butadiene, chloroethylene, vinylidene chloride, 6-hydroxy-1-hexene, cyclopentadiene, 4-pentenoic acid, methyl 8-nonenoate, vinyl sulfone acid, trimethylvinylsilane, trimethoxy vinylsilane, butadiene, pentadiene, isoprene, 1,4-divinylcyclohexane, 1,2,5-trivinylcyclohexane, etc.

(2) α,β-unsaturated carboxylic acids and their salts: acrylic acid, methacrylic acid, itaconic acid, maleic acid, sodium acrylate, ammonium methacrylate, potassium itaconate, etc.

(3) α,β-unsaturated carboxylic esters: alkyl acrylates such as methyl acrylate, ethyl acrylate, t-butyl acrylate and adamantyl acrylate; substituted alkyl acrylates such as 2-chloroethyl acrylate, benzyl acrylate, 2-cyanoethyl acrylate and allyl acrylate; alkyl methacrylate such as methyl methacrylate, t-butyl methacrylate and adamantyl methacrylate; substituted alkyl methacrylates such as 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, ω-methoxy polyethylene glycol methacrylate (mol of polyoxyethylene added: 2 to 100), polyethylene glycol monomethacrylate (mol of polyoxyethylene added: 2 to 100), polypropylene glycol monomethacrylate (mol of polyoxypropylene added: 2 to 100), 2-carboxyethyl methacrylate, 3-sulfopropyl methacrylate, 4-oxysulfo butyl methacrylate, 3-trimethoxysilyl propyl methacrylate and allyl methacrylate; derivatives of unsaturated dicarboxylic acids such as monobutyl maleate, dimethyl maleate, monomethyl itaconate and dibutyl itaconate; multifunctional esters such as ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate and 1,2,4-cyclohexane tetramethacrylate; etc.

(4) Amides of α,β-unsaturated carboxylic acids: acrylamide, methacrylamide, N-methylacrylamide, N,N-dimethylacrylamide, N-methyl-N-hydroxyethyl methacrylamide, N-tert-butylacrylamide, N-tert-octyl methacrylamide, N-cyclohexyl acrylamide, N-phenyl acrylamide, N-(2-acetoacetoxyethyl)acrylamide, N-acryloyl morpholine, diacetone acrylamide, diamide of itaconic acid, N-methyl maleimide, 2-acrylamide-2-methylpropanesulfonic acid, methylene bisacrylamide, dimethacryloyl piperazine, etc.

(5) Styrene and derivatives thereof: styrene, vinyltoluene, p-tert-butylstyrene, vinylbenzoic acid, methyl vinylbenzoate, α-methylstyrene, p-chloromethylstyrene, vinylnaphthalene, p-hydroxymethylstyrene, sodium p-styrenesulfonate, potassium p-styrene sulfinate, 1,4-divinylbenzene, 4-vinylbenzoic acid-2-acryloyl ethyl ester, etc.

(6) Vinyl ethers: methyl vinyl ether, butyl vinyl ether, methoxyethyl vinyl ether, etc.

(7) Vinyl esters: vinyl acetate, vinyl propionate, vinyl benzoate, vinyl salicylate, vinyl chloroacetate, etc.

(8) Other monomers: N-vinylpyrrolidone, 2-vinyl oxazoline, 2-isopropenyl oxazoline, divinyl sulfone, etc.

(b) Specific Examples of Polymers

Specific examples (P-1 to P-29) of polymers in polymer latexes usable for the present invention will be described below without intention of restriction. In the case of copolymers, ratios in parentheses represent the mass ratios of monomers.

P-1) Poly(t-butyl methacrylate) with Tg of 118° C.,
P-2) Polyphenyl methacrylate with Tg of 110° C.,
P-3) Polymethyl methacrylate with Tg of 105° C.,
P-4) Polyacrylonitrile with Tg of 125° C.,
P-5) Polypentachlorophenyl acrylate with Tg of 147° C.,
P-6) Polyadamantyl methacrylate with Tg of 140° C.,
P-7) Poly(t-butyl methacrylamide) with Tg of 160° C.,
P-8) Polystyrene with Tg of 100° C.,
P-9) Polymethacrylonitrile with Tg of 120° C.,
P-10) Acrylonitrile-methacrylic acid copolymer (95:5) with Tg of 123° C.,
P-11) Methyl methacrylate-acrylic acid copolymer (97:3) with Tg of 104° C.,
P-12) Methacrylonitrile-acrylic acid copolymer (95:5) with Tg of 104° C.,
P-13) Methyl methacrylate-acrylic acid copolymer (95:5) with Tg of
P-14) Polyvinyl chloride with Tg of 93° C.,
P-15) Acrylonitrile-ethyl acrylate copolymer (70:30) with Tg of 68° C.,
P-16) Polyethyl methacrylate with Tg of 65° C.,
P-17) Polyisopropyl methacrylate with Tg of 81° C.,
P-18) Polyisobutyl chloroacrylate with Tg of 90° C., P-19) Isopropyl methacrylate-acrylic acid copolymer (96:4) with Tg of 80° C., P-20) Acrylonitrile-butyl acrylate copolymer (80:20) with Tg of 79° C., P-21) Adamantyl methacrylate-methyl methacrylate-acrylic acid copolymer (60:35:5) with Tg of 110° C., P-22) Copolymer of methacrylonitrile, ester of polyethylene glycol monomethyl ether and methacrylic acid (the number of ethyleneoxy chain repetition units: 23), and acrylic acid (90:8:2) with Tg of 104° C., P-23) Methyl methacrylate-divinylbenzene copolymer (97:3) with Tg of 101° C., P-24) Methyl methacrylate-styrenesulfonic acid copolymer (92:8) with Tg of 105° C., P-25) Methyl methacrylate-ethylene glycol dimethacrylate copolymer (95:5) with Tg of 101° C., P-26) Polystyrene-divinylbenzene copolymer (95:5) with Tg of 100° C. for core portion, and methyl methacrylate-methacrylic acid copolymer (97:3) with Tg of 101° C. for shell portion, P-27) Poly(4-chlorostyrene) with Tg of 115° C. for core portion, and acrylonitrile-butyl acrylate-methacrylic acid copolymer (80:17:3) with Tg of 81° C. for shell portion, P-28) Polystyrene with Tg of 100° C. for core portion, and methyl methacrylate-methacrylic acid copolymer (97:3) with Tg of 101° C. for shell portion, and P-29) Poly(4-butylstyrene) with Tg of 7° C. for core portion, and methyl methacrylate-methacrylic acid copolymer (97:3) with Tg of 101° C. for shell portion.

(B) Electron-donating, Organic Color Former

The electron-donating, organic color formers preferably used in the present invention are known in the art, and they are not particularly restrictive. The known electron-donating, organic color formers are described in Moriga and Yoshida, "Dyestuff & Chemicals," Vol. 9, page 84 issued by Kaseihin Kogyo Kyokai (1964), "Handbook of Dyes, New Edition," page 242, issued by Maruzen Co., Ltd. (1970), R. Garner, "Reports on the Progress of Appl. Chem." Vol. 56, page 199 (1971), "Dyestuff & Chemicals" Vol. 19, page 230 issued by Kaseihin Kogyo Kyokai (1974), "Coloring Matters" Vol. 62, page 288 (1989), "Dyeing Industry," Vol. 32, page 208, etc.

The electron-donating, organic color formers are classified into several groups in accordance with their structures. Preferable examples of the electron-donating, organic color formers used in the present invention include diarylphthalide compounds, fluoran compounds, indolylphthalide compounds, acyl leucoazine compounds, leuco auramine compounds, spiropyran compounds, rhodamine lactam compounds, triarylmethane compounds and chromene compounds. Specific examples of the electron-donating, organic color formers usable in the present invention will be illustrated below in structural formulae.

(a) Diarylphthalide Compounds (1)

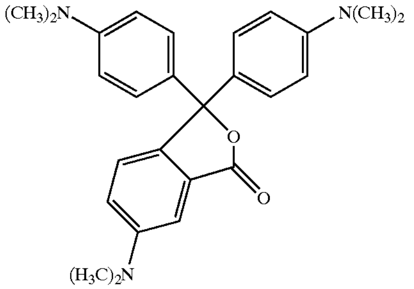

-continued (2)

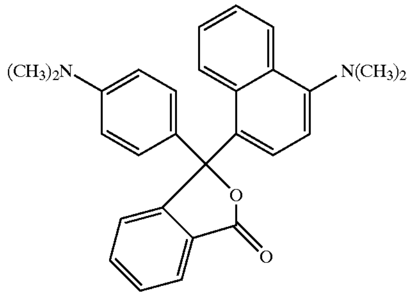

(3)

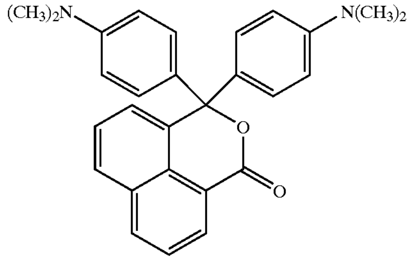

(4)

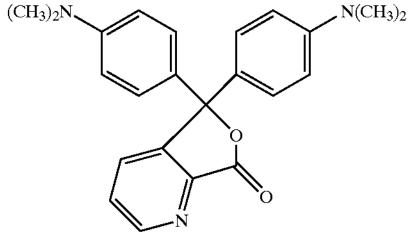

(b) Fluoran Compounds (5)

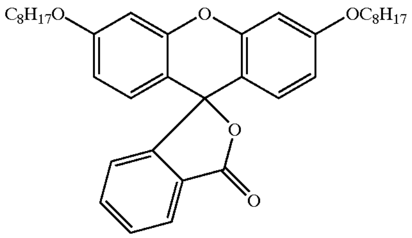

(6)

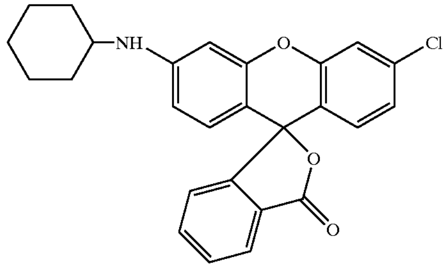

(7)

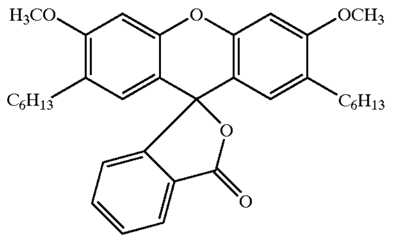

-continued
(8)
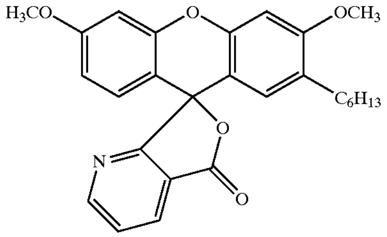
(9)
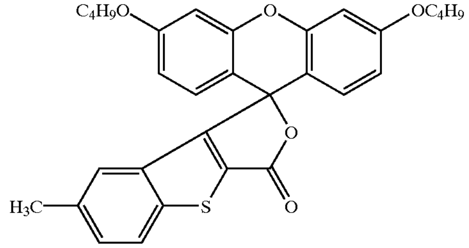
(10)
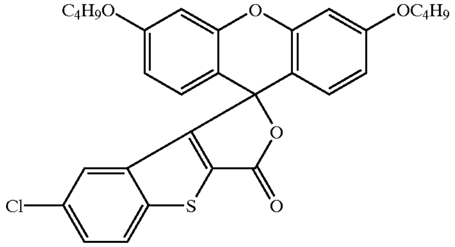
(11)
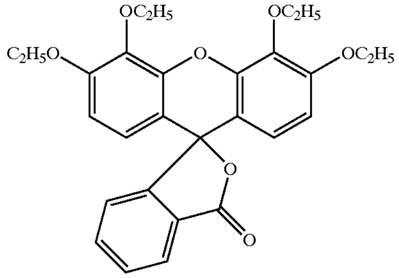
(12)
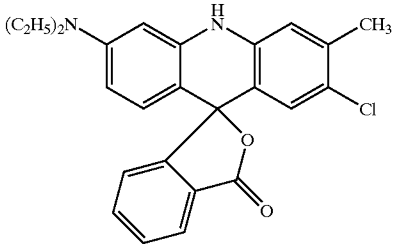
(13)
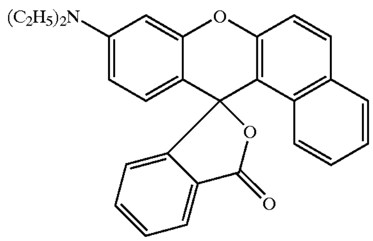
-continued
(14)
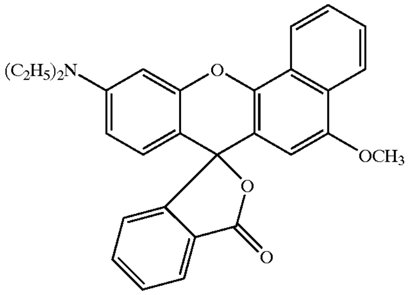
(15)
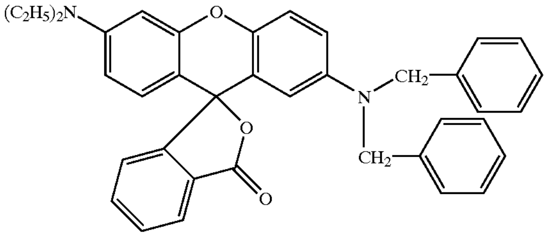
(16)
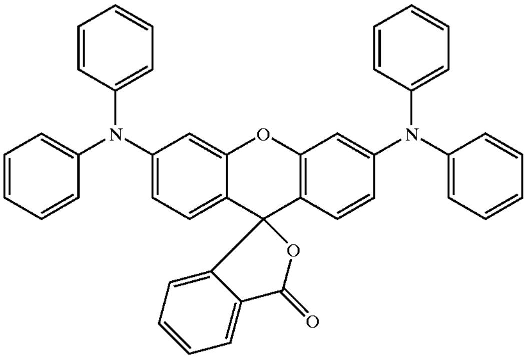
(17)
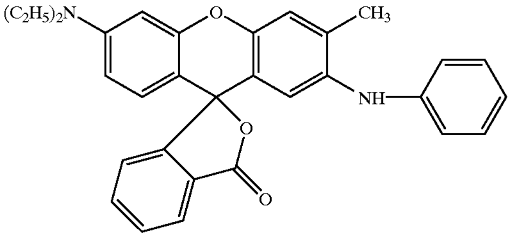
(18)
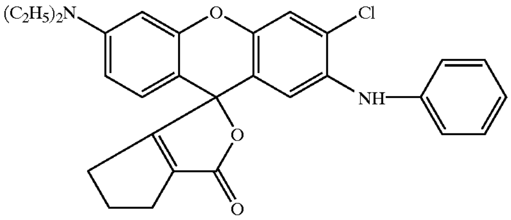
(19)
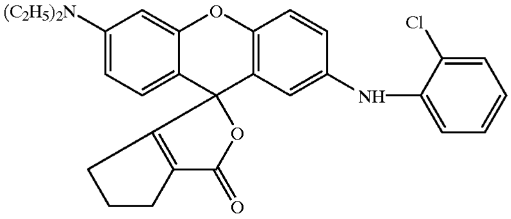

-continued
(20)
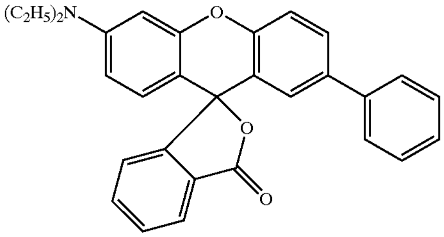
(21)
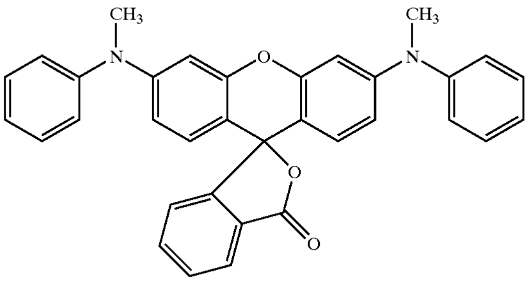
(c) Indolylphthalide Compounds
(22)
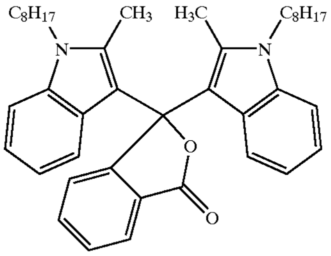
(23)
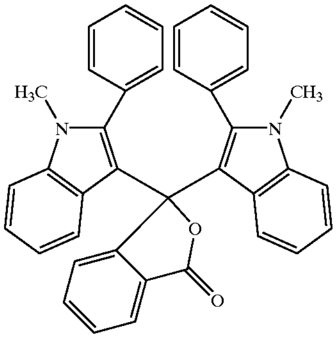
(24)
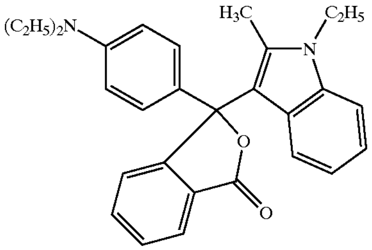
-continued
(25)
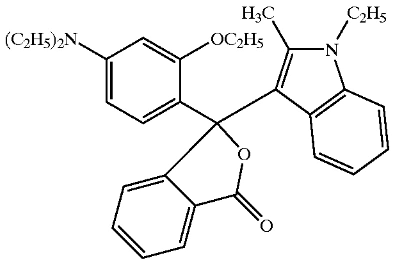
(26)
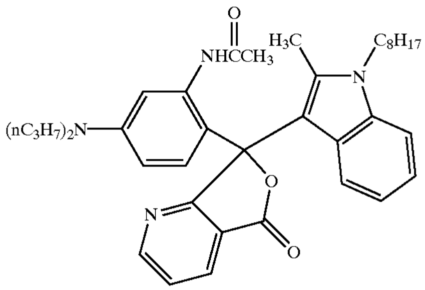
(27)
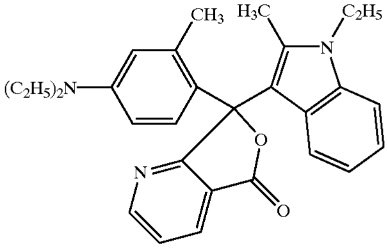
(28)
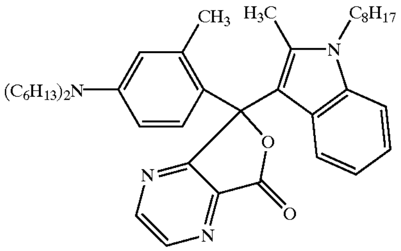
(29)
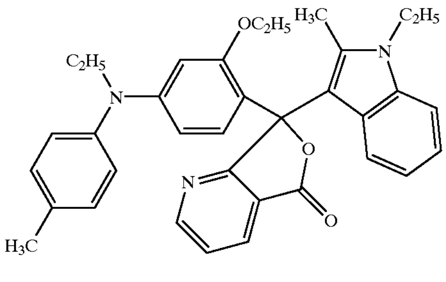
(30)
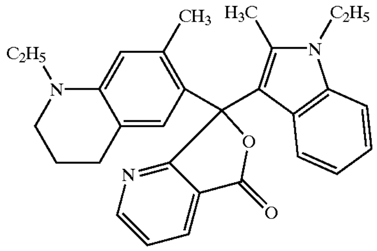

-continued
(31)
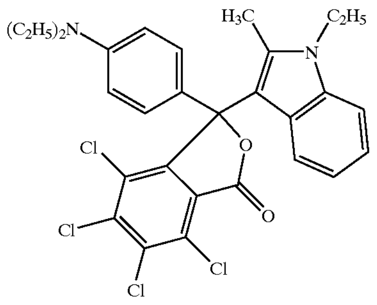
(d) Acyl Leucoazine Compounds
(32)
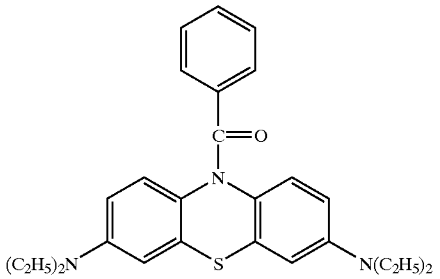
(33)
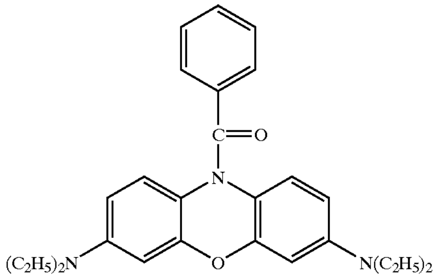
(34)
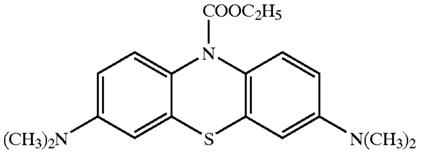
(35)
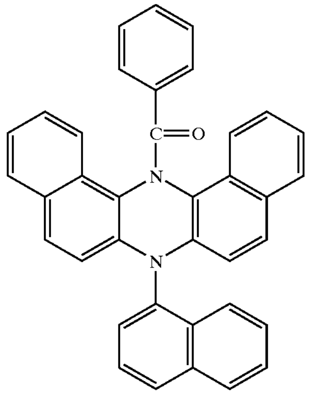
(e) Leuco Auramine Compounds
(36)
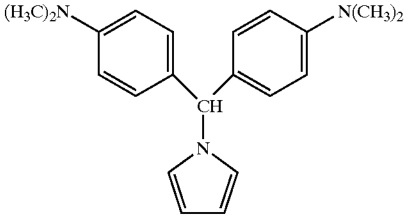
(37)
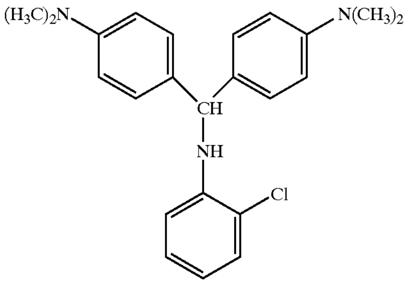
(38)
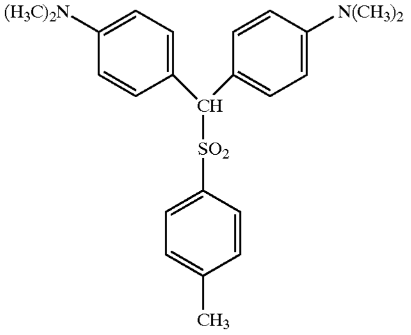
(39)
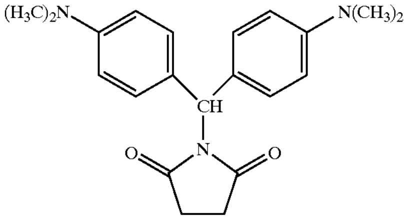
(f) Spiropyran Compounds
(40)
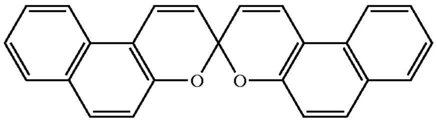
(41)
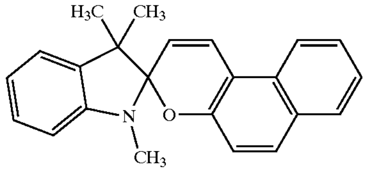

(g) Rhodamine Lactam Compounds
(42)
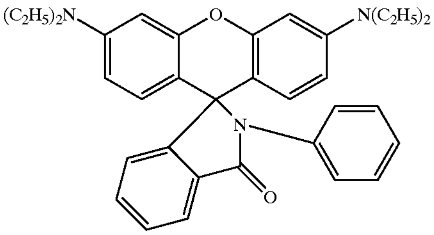
(43)
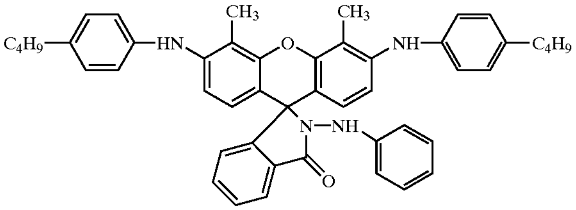
(h) Triarylmethane Compounds
(44)
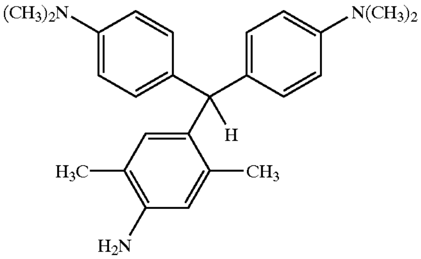
(45)
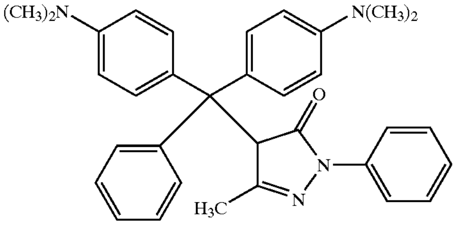
(46)
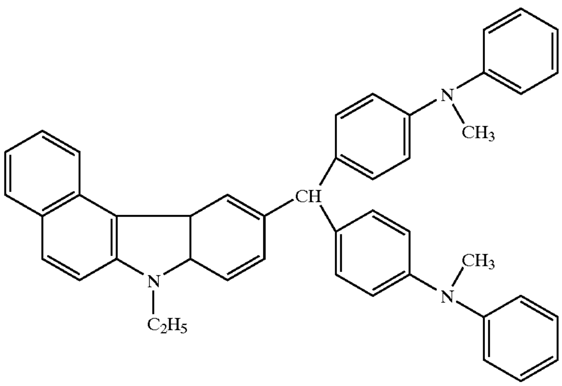
-continued
(47)
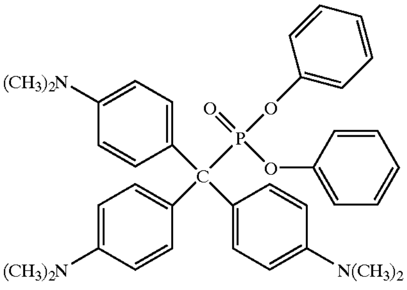
(i) Chromene Compounds
(48)
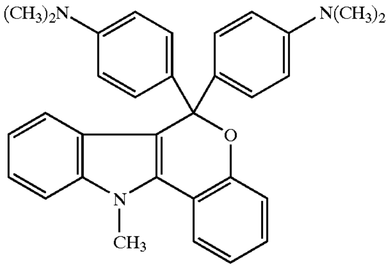
(49)
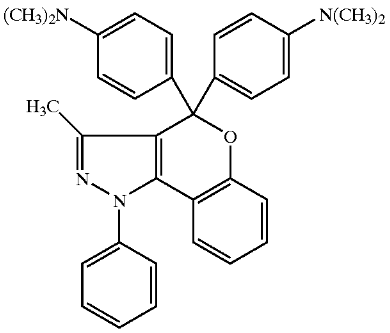
(50)
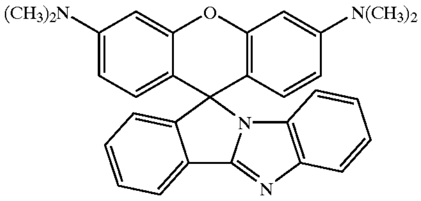
(j) Other Compounds
(51)
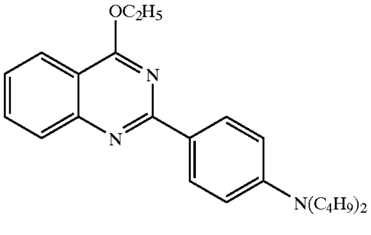
(52)
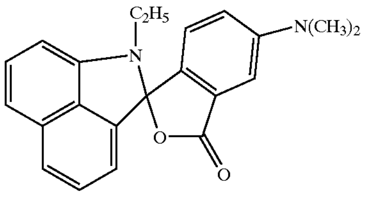

-continued (53)

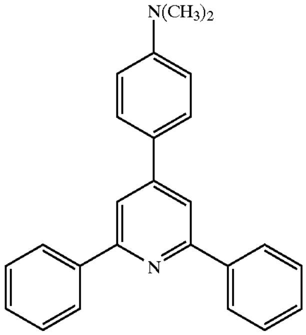

When laser light sources such as semiconductor laser sources, etc. widely used at present are used, it is possible to use electron-donating, organic color formers that cause color development in a range of wavelength longer than 620 nm. Examples of such electron-donating, organic color formers include 2,6-diaminofluoran compounds having a ring structure at 2- and 3-positions disclosed in JP 3-14878 A, JP 3-244587 A and JP 4-173288 A; fluoran compounds having a substituent comprising p-phenylenediamine moiety disclosed in JP 61-284485 A and JP 3-239587 A; thiofluoran compounds disclosed in JP 52-106873 A; 3,3-bis(4-substituted aminophenyl) azaphthalide compounds disclosed in JP 5-139026 A and JP 5-179151 A; phthalide compounds having a vinyl group disclosed in JP 58-5940 B, JP 58-27825 B and JP 62-24365 B; fluorene compounds disclosed in JP 63-94878 A and JP 3-202386 A; sulfonylmethane compounds having a vinyl group disclosed in JP 60-230890 A and JP 60-231766 A; and compounds having a phenothiazine or phenoxazine ring disclosed in JP 63-199268 A. Specific examples of the electron-donating, organic color formers preferably used in the present invention will be illustrated below.

(54)

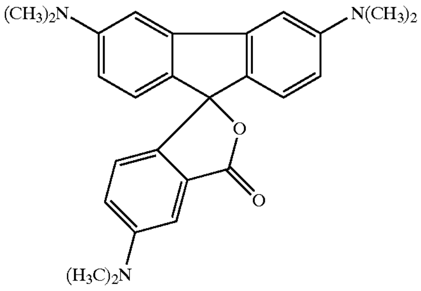

(55)

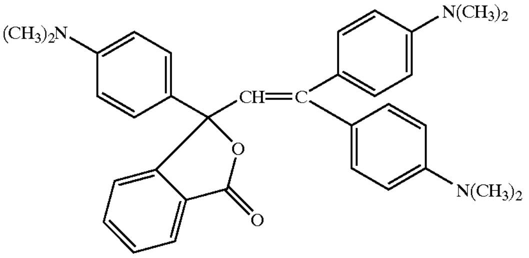

(56)

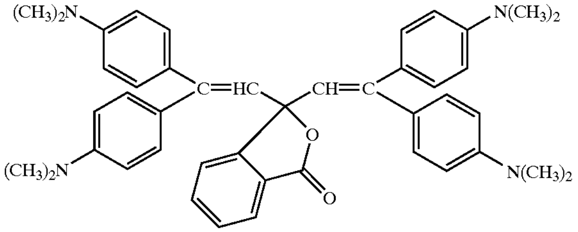

(57)

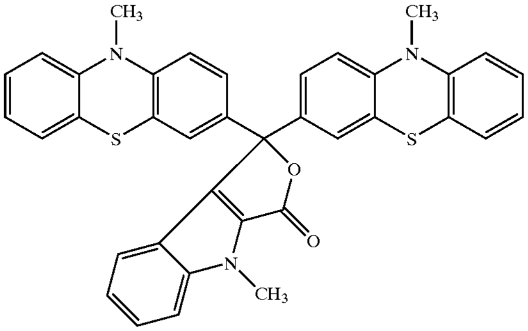

(58)

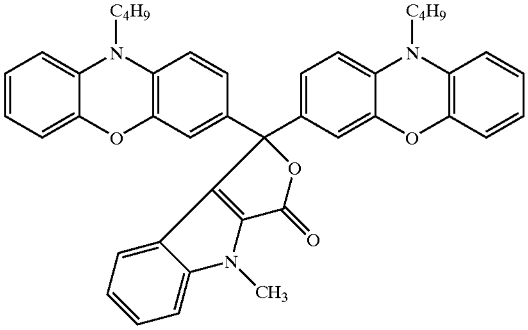

-continued (59)

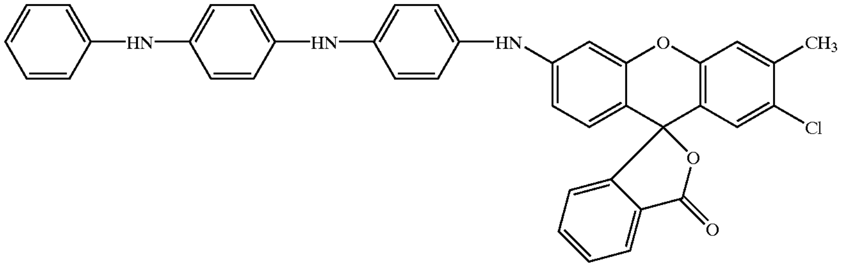

(60)

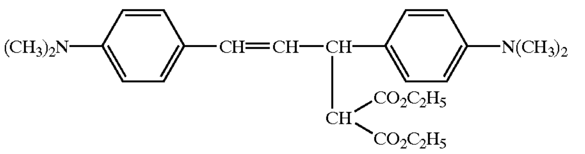

(61)

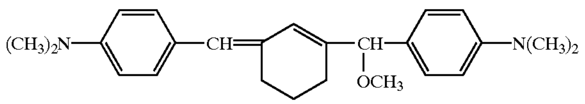

(62)

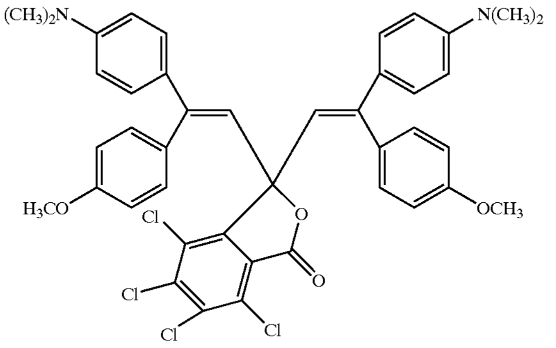

(63)

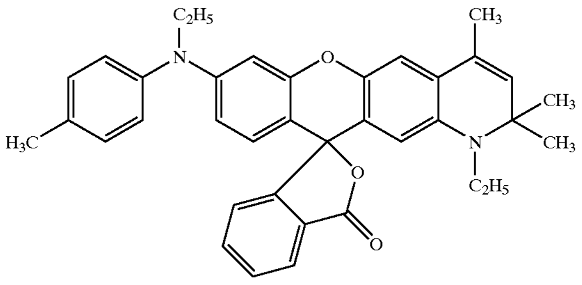

(64)

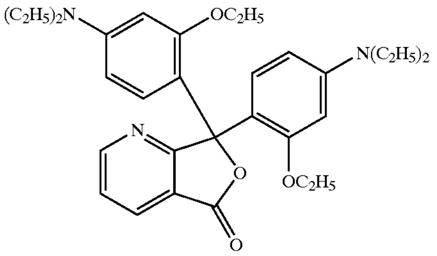

(65)

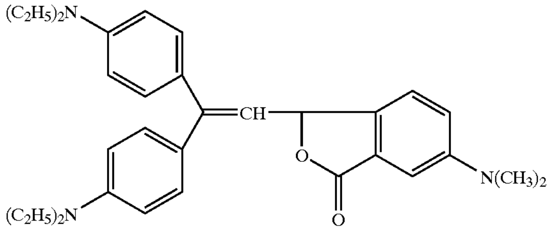

(66)

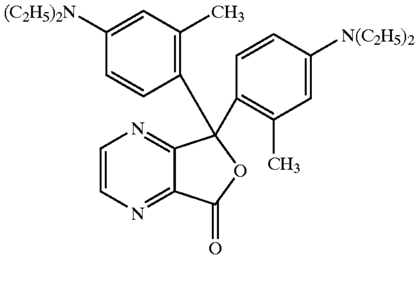

(67)

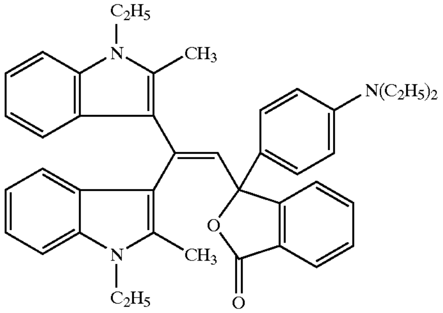

It should be noted that the above specific examples are only part of the electron-donating, organic color formers, and that the electron-donating, organic color formers used in the present invention are not limited thereto. The electron-donating, organic color formers may be used alone or in combination.

(C) Acidic Compounds

The acidic compound acts as a color-developing agent, specifically having a function to cause the above electron-donating, organic color former to develop color. The preferred acidic compounds are phenol compounds. The acidic compounds may be used alone or in combination. For instance, phenol compounds and other acidic compounds than phenol compounds may be combined. Phenol compounds and other acidic compounds than phenol compounds will be described in detail below.

(a) Phenol Compounds

The phenol compounds may be any of monovalent phenols, divalent phenols and polyvalent phenols, and may have substituents on their benzene ring, such as alkyl groups, aryl groups, acyl groups, alkoxycarbonyl groups, carboxyl groups and esters thereof, amide groups, halogens, etc. The phenol compound may have a bisphenol structure or a trisphenol structure.

Preferred examples of the phenolic color-developing agents include, phenol, o-cresol, tert-butylphenol, nonylphenol, n-octyl phenol, n-dodecyl phenol, n-stearyl phenol, p-chlorophenol, p-bromophenol, o-phenylphenol, n-butyl p-hydroxybenzoate, n-octyl p-hydroxybenzoate, n-dodecyl p-hydroxybenzoate, resorcin, dodecyl gallate, 2,2-bis(4'-hydroxyphenyl)propane, 4,4'-dihydroxydiphenylsulfone, 1,1-bis(4'-hydroxyphenyl) ethane, 2,2-bis(4'-hydroxy-3-methylphenyl) -propane, bis (4'-hydroxyphenyl)methane, bis(4-hydroxyphenyl)sulfide, 1-phenyl-1,1-bis(4'-hydroxyphenyl)ethane, 1,1-bis(4'-hydroxyphenyl)-3-methylbutane, 2,2-bis(4'-hydroxyphenyl) butane, 2,2-bis(4'-hydroxyphenyl)ethyl propionate, 2,2-bis (4'-hydroxyphenyl)-4-methylpentane, 1,1-bis(4'-hydroxyphenyl)-2-methylpropane, 2,2-thiobis(6-tert-butyl-3-methylphenol), 2,2-bis(4'-hydroxyphenyl) hexafluoropropane, 1,1-bis(4'-hydroxyphenyl)-n-pentane, 1,1-bis(4'-hydroxyphenyl)-n-hexane, 1,1-bis(4'-hydroxyphenyl)-n-heptane, 1,1-bis(4'-hydroxyphenyl)-n-octane, 1,1-bis(4'-hydroxyphenyl)-n-nonane, 1,1-bis(4'-hydroxyphenyl)-n-decane, 1,1-bis(4'-hydroxyphenyl)-n-dodecane, 2,2-bis(4'-hydroxyphenyl)-n-heptane, 2,2-bis(4'-hydroxyphenyl)-n-nonane, 1,1-bis(4'-hydroxyphenyl)-4-methylbutane, 1,1-bis(3'-methyl-4'-hydroxyphenyl)-n-hexane, etc.

(b) Other Acidic Compounds Than Phenol Compounds

Preferred examples of other acidic compounds than phenol compounds include boric acid, oxalic acid, maleic acid, tartaric acid, citric acid, succinic acid, benzoic acid, stearic acid, gallic acid, salicylic acid, 1-hydroxy-2-naphthoic acid, o-hydroxybenzoic acid, m-hydroxybenzoic acid, 2-hydroxy-p-toluic acid, benzenesulfinic acid, anthraquinone-1-sulfenic acid, etc. These compounds may comprise various substituents.

(D) Decoloring Agents

The heat-responsive-discoloring coloring composition of the present invention preferably contains a decoloring agent for the purpose of accelerating discoloration by temperature elevation. Preferably usable as the decoloring agent are compounds functioning as decoloring agents at high temperatures, such as alcohols, esters, ketones, ethers, etc. Polymers and oligomers containing these compounds as repeating units are also effective.

(a) Alcohols

Specific examples of alcohols include decane-1-ol; undecane-1-ol; lauryl alcohol; tridecane-1-ol; myristyl alcohol; pentadecane-1-ol; cetyl alcohol; heptadecane-1-ol; stearyl alcohol; octadecane-2-ol; eicosane-1-ol; docosane-1-ol; 6-(perfluoro-7-methyloctyl)hexanol; cyclododecanol; 1,4-cyclohexanediol, 1,2-cyclohexanediol; 1,2-cyclododecanediol; sterol compounds such as cholesterol, stigmasterol, pregnenolone, methylandrostenediol, estradiol benzoate, epiandrostene, stenolone, β-sitosterol, pregnenolone acetate, β-cholestarol, 5,16-pregnadiene-3β-ol-20-one, 5α-pregnene-3β-ol-20-one, 5-pregnene-3β,17-diol-20-one 21-acetate, 5-pregnene-3β,17-diol-20-one 17-acetate, 5-pregnene-3β, 21-diol-20-one 21-acetate, 5-pregnene-3β, 17-diol diacetate, rockogenin, tigogenin, esmilagenin, hecogenin and diosgenin; saccharides and derivatives thereof such as glucose and saccharose; alcohols having a cyclic structure such as 1,2:5,6-di-isopropylidene-D-mannitol; etc.

(b) Esters

The esters preferably used in the present invention are classified into the following groups (1) to (4):

(1) Esters with the total number of carbon atoms of 10 or more, which are derived from monovalent aliphatic acids and aliphatic or alicyclic monovalent alcohols;

(2) Polybasic acid esters with the total number of carbon atoms of 28 or more, which are derived from aliphatic divalent or polyvalent carboxylic acids and aliphatic or alicyclic monovalent alcohols;

(3) Esters with the total number of carbon atoms of 26 or more, which are derived from aliphatic divalent or polyvalent alcohols and monovalent aliphatic acids; and (4) Esters with the total number of carbon atoms of 28 or more, which are derived from aromatic divalent alcohols and monovalent aliphatic acids.

Examples of the esters (1) with the total number of carbon atoms of 10 or more, which are derived from monovalent aliphatic acids and aliphatic or alicyclic monovalent alcohols, include ethyl caprylate, n-butyl caprylate, n-octyl caprylate, lauryl caprylate, cetyl caprylate, stearyl caprylate, n-butyl caprate, n-hexyl caprate, myristyl caprate, docosyl caprate, methyl laurate, 2-ethylhexyl laurate, n-decyl laurate, stearyl laurate, ethyl myristate, 3-methylbutyl myristate, 2-methylpentyl myristate, n-decyl myristate, cetyl myristate, stearyl myristate, isopropyl palmitate, neopentyl palmitate, n-nonyl palmitate, n-undecyl palmitate, lauryl palmitate, myristyl palmitate, cetyl palmitate, stearyl palmitate, cyclohexyl palmitate, cyclohexylmethyl palmitate, methyl stearate, ethyl stearate, n-propyl stearate, n-butyl stearate, n-amyl stearate, 2-methylbutyl stearate, n-hexyl stearate, n-heptyl stearate, 3,5,5-trimethylhexyl stearate, n-octyl stearate, 2-ethylhexyl stearate, n-nonyl stearate, n-decyl stearate, n-undecyl stearate, lauryl stearate, n-tridecyl stearate, myristyl stearate, n-pentadecyl stearate, cetyl stearate, stearyl stearate, eicosyl stearate, n-docosyl stearate, cyclohexyl stearate, cyclohexylmethyl stearate, oleyl stearate, isostearyl stearate, n-butyl 1,2-hydroxystearate, n-methyl behenate, n-ethyl behenate, n-propyl behenate, isopropyl behenate, n-butyl behenate, isobutyl behenate, 2-methylbutyl behenate, n-amyl behenate, neopentyl behenate, n-hexyl behenate, 2-methylpentyl behenate, n-heptyl behenate, 2-ethylhexyl behenate, n-nonyl behenate, myristyl behenate, n-undecyl behenate, lauryl behenate, n-tridecyl behenate, myristyl behenate, n-pentadecyl behenate, cetyl behenate, stearyl behenate, behenyl behenate, etc.

Examples of the polybasic acid esters (2) with the total number of carbon atoms of 28 or more, which are derived from aliphatic divalent or polyvalent carboxylic acids and aliphatic or alicyclic monovalent alcohols, include dimyristyl oxalate, dicetyl oxalate, dilauryl malonate, dicetyl malonate, distearyl malonate, dilauryl succinate, dimyristyl succinate, dicetyl succinate, distearyl succinate, dilauryl glutarate, diundecyl adipate, dilauryl adipate, di-n-tridecyl adipate, dimyristyl adipate, dicetyl adipate, distearyl adipate, di-n-docosyl adipate, di-n-decyl azelate, dilauryl azelate, di-n-tridecyl azelate, di-n-nonyl sebacate, dimyristyl sebacate, distearyl sebacate, di-n-pentyl 1,18-octadecylmethylene dicarboxylate, di-n-octyl 1,18-octadecylmethylene dicarboxylate, dicyclohexylmethyl 1,18-octadecylmethylene dicarboxylate, dineopentyl 1,18-octadecylmethylene dicarboxylate, di-n-hexyl 1,18-octadecylmethylene dicarboxylate, di-n-heptyl 1,18-octadecylmethylene dicarboxylate, di-n-octyl 1,1 8-octadecylmethylene dicarboxylate, etc.

Examples of the esters (3) of aliphatic bivalent or polyvalent alcohols and monovalent aliphatic acids, the total number of carbon atoms being 26 or more, include ethylene glycol dimyristate, ethylene glycol dipalmitate, ethylene glycol distearate, propylene glycol dilaurate, propylene glycol dimyristate, propylene glycol dipalmitate, butylene glycol distearate, hexylene glycol dilaurate, hexylene glycol dimyristate, hexylene glycol dipalmitate, hexylene glycol distearate, 1,5-pentanediol distearate, 1,2,6-hexanetriol dimyristate, pentaerythritol trimyristate, pentaerythritol tetralaurate, 1,4-cyclohexanediol didecyl, 1,4-cyclohexanediol dimyristyl, 1,4-cyclohexanediol distearyl, dilaurate of 1,4-cyclohexane dimethanol, dimyristate of 1,4-cyclohexane dimethanol, etc.

Examples of the esters (4) with the total number of carbon atoms of 28 or more, which are derived from aromatic divalent alcohols and monovalent aliphatic acids, include xylene glycol dicaprate, xylene glycol di-n-undecanate, xylene glycol dilaurate, xylene glycol dimyristate, xylene glycol dipalmitate, xylene glycol distearate, etc.

(c) Ketones

Ketones are preferably compounds having 10 or more carbon atoms, specifically decane-2-one, undecane-2-one, laurone, stearone, etc.

(d) Ethers

Examples of ethers include butyl ether, hexyl ether, di-isopropyl benzyl ether, diphenyl ether, dioxane, ethylene glycol dibutyl ether, diethylene glycol dibutyl ether, ethylene glycol diethyl ether, diethylene glycol diethyl ether, ethylene glycol diphenyl ether, etc.

The above decoloring agents may be used alone or in combination. Stabilizers described later and the above polymers may be provided with a discoloration function by having structures of alcohols, ketones, esters, ethers, etc. therein, thereby doing without decoloring agents.

(E) Hydrophilic Binders

Hydrophilic binders preferably used in the present invention may be hydrophilic binders described in JP 64-13546 A, pages 71 to 75. The hydrophilic binders are preferably transparent or translucent, and their specific examples include natural compounds such as proteins such as gelatin, gelatin derivatives, etc.; polysaccharides such as cellulose derivatives, starch, gum arabic, dextran, pullulan, etc.; synthetic high-molecular compounds such as polyvinyl alcohol, modified polyvinyl alcohol (end-alkyl-modified Povals such as MP103, MP203, etc. available from Kuraray Co., Ltd.), polyvinyl pyrrolidone, polyacrylamide, etc. High-water-absorption polymers described in U.S. Pat. No. 4,960,681, JP 62-245260 A, etc., namely homopolymers of vinyl monomers having —COOM or —$SO_3M$, wherein M is a hydrogen atom or an alkali metal, or copolymers of these vinyl monomers or copolymers of these vinyl monomers and other vinyl monomers (sodium methacrylate, ammonium methacrylate, Sumikagel L-5H, etc. available from Sumitomo Chemical Co. Ltd.) may also be used. Two or more of these hydrophilic binders may be combined. In this case, combinations of gelatin and other hydrophilic binders are preferable.

The gelatin used as the hydrophilic binder includes, for instance, lime-treated gelatin, acid-treated gelatin, a so-called demineralized gelatin in which the content of calcium, etc. is reduced, etc. The type of gelatin used may be determined depending on the purpose, and two or more types of gelatin may be combined.

(F) Amounts of Components (a) Amount of Polymer

In the heat-responsive-discoloring coloring composition of the present invention, the amount of the polymer added is preferably 1 to 1,000 parts by mass, more preferably 5 to 500 parts by mass, based on 1 part by mass of the electron-donating, organic color former. When the amount of the polymer added is less than 1 part by mass, there is an insufficient function to fix a reversible change between discoloration and color development on the side of discoloration. On the other hand, when the amount of polymer added is more than 1,000 parts by mass, it is not easy to obtain change between discoloration and color development.

(b) Amount of Electron-donating Color Former

When the heat-responsive-discoloring coloring composition of the present invention is used in the coloring layer, the amount of the electron-donating color former added is preferably 0.01 to 10 $mmol/m^2$, more preferably 0.05 to 5 $mmol/m^2$.

(c) Amount of Acidic Compound

The amount of the acidic compound (color-developing agent) added is preferably 0.1 to 10 parts by mass, more preferably 1 to 4 parts by mass, based on 1 part by mass of the electron-donating, organic color former. When the amount of the color-developing agent added is less than 0.1 parts by mass, insufficient coloring tends to be obtained by interaction between the electron-donating, organic color former and the color-developing agent. On the other hand, when the amount of the color-developing agent added is more than 10 parts by mass, it is difficult to fully prevent the interaction therebetween.

(d) Amount of Decoloring Agent

The amount of the decoloring agent added is preferably 0.1 to 100 parts by mass, more preferably 1 to 10 parts by mass, based on 1 part by mass of the electron-donating, organic color former. When the decoloring agent is less than 0.1 parts by mass, other materials, namely a stabilizer and a polymer are needed in the change from a colored state to a discolored state. On the other hand, when the decoloring agent is more than 100 parts by mass, color development is difficult.

(G) Formulating Method

Though an electron-donating color former forming the heat-responsive-discoloring coloring composition of the present invention, a polymer having a glass transition temperature (Tg) of 60° C. to 200° C., a color-developing agent, a decoloring agent, etc. may be formulated at the same time, it is preferable that the electron-donating color former and the color-developing agent are mixed in advance to cause color development. The polymer is added preferably in the form of an aqueous dispersion. The decoloring agent may be mixed with other components in advance or may be separately added at the time of heating. It is presumed that color development is caused by strong interaction between the electron-donating, organic color former and the color-developing agent due to interaction between the color-developing agent and the decoloring agent at low temperatures. However, the above three components are uniformly mixed at high temperatures, resulting in strong interaction between the color-developing agent and the decoloring agent, thereby causing discoloration.

Though the formulation method of the electron-donating color former, the color-developing agent and the decoloring agent is not restrictive, preferable is a method in which fine particles containing these compounds are dispersed in a hydrophilic binder such as gelatin, PVA, etc. In this case, particles may be capsulated.

The electron-donating color former, the color-developing agent and the decoloring agent may be in the form of so-called oligomers and polymers in which two or more molecules are bonded. The decoloring agent may preferably be a polymer dispersed in an aqueous liquid. This aqueous dispersion may be prepared by emulsion polymerization and suspension polymerization, or by finely dispersing those bulk-polymerized in an aqueous solution.

In the present invention, a time period until the coloring composition of the present invention changes from a discoloration initiation temperature (T) to an equilibrium color concentration, which is referred to as "discoloring time," is preferably within 20 seconds, more preferably within 10 seconds. Accordingly, the types and amounts of the electron-donating color former, the color-developing agent and the decoloring agent are preferably selected to meet this criterion.

(H) Stabilizers

To keep a colored state before treatment, a stabilizer may be added to the heat-responsive-discoloring coloring composition of the present invention. Useful as the stabilizers are discoloration-preventing agents for photographs described in Research Disclosure (hereinafter referred to as RD) No. 17,643 (1978) page 25, RD No. 18,716 (1979) page 650, and RD No. 307,105 (1989) page 72. Preferable among them are hindered phenols. Also useful are discoloration-preventing agents (stability-improving agents) for heat-sensitive recording papers described in "Paper Pulp Technology Times," March, 1995, pages 4 to 5. Preferable among them are hydroxybisphenol compounds, phenol compounds, 3-hydroxy-2-naphthamide derivatives, thiobenzoate derivatives, gallic acid derivatives, hindered phenol derivatives, diphenylpropane derivatives, novolak-type epoxy resins, etc., more preferable among them are hindered phenol derivatives.

Though the method for adding a stabilizer is not particularly restrictive, it is preferable to introduce the stabilizer into fine particles or microcapsules together with the electron-donating color former and the color-developing agent.

[2] Heat-responsive-discoloring Coloring Element

The heat-responsive-discoloring coloring element of the present invention is made by forming a heat-responsive-discoloring coloring layer comprising the above heat-responsive-discoloring coloring composition on a substrate. Two or more dyes may be mixed in one coloring layer, and for instance, three types of dyes; yellow, magenta and cyan, may be mixed. In addition, two or more coloring layers may be formed.

The substrate in the present invention is not particularly limited as long as it has resistance to heat treatment temperatures. Generally usable are photographic substrates such as papers, synthetic polymer films, etc. described in "Basics of Photographic Engineering—Silver Salt Photography—" edited by the Society of Photographic Science and Technology of Japan, issued by Corona Publishing Co., Ltd., 1979, pages 223 to 240, etc. Specific examples of materials forming substrates include polyethylene terephthalate, polyethylene naphthalate, polycarbonate, polyvinyl chloride, polystyrene, polypropylene, polyimide, celluloses such as triacetyl cellulose, etc. These materials may be used alone or laminated with polyethylene, etc. on one side or both sides.

In addition, such substrates as disclosed in JP 62-253159 A, pages 29 to 31, JP 1-161236 A, pages 14 to 17, JP 63-316848 A, JP 2-22651 A, JP 3-56955 A, U.S. Pat. No. 5,001,033, etc. may be used. To have improved optical and physical properties, these substrates may be subjected to heat treatment for controlling crystallinity and orientation, monoaxial and biaxial orientation for orientation control, blending with various polymers, surface treatment, etc.

Particularly when there are strict requirements of heat resistance and curl properties, substrates described in JP 6-41281 A, JP 6-43581 A, JP 6-51426 A, JP 6-51437 A, JP 6-51442 A, etc. may be preferably used. In addition, substrates made of styrene polymers mainly having a syndiotactic structure may be preferably used. With respect to the preferably usable polyester substrates, their details are described in the Journal of Technical Disclosure 94-6023 (the Japan Institute of Invention and Innovation; Mar.15, 1994).

The thickness of the substrate is preferably 5 to 200 $\mu$m, more preferably 40 to 120 $\mu$m.

[3] Method for Detecting Thermal History of Article

The method of the present invention for detecting the thermal history of an article comprises the steps of applying the heat-responsive-discoloring coloring composition to an article, and measuring the color concentration of the heat-responsive-discoloring coloring composition, thereby detecting the thermal history of the article. Specifically, the heat-responsive-discoloring coloring composition is prepared and applied to the article, such that a discoloration initiation temperature (T) is a particular temperature (for instance, the highest temperature of compensation) of the article. Measuring the color concentration after a certain period of time has passed to determine whether the article is discolored or not, the thermal history of the article is detected. Another method of the present invention for detecting the thermal history of an article comprises the steps of disposing the heat-responsive-discoloring coloring element near an article, and measuring the color concentration of the heat-responsive-discoloring coloring composition to detect the thermal history of the article. In this case, taking into consideration the positional relation and distance between the heat-responsive-discoloring coloring element and the article, the discoloration initiation temperature (T) of the heat-responsive-discoloring coloring composition is controlled, such that the heat-responsive-discoloring coloring composition is discolored when the article has reached a particular temperature.

As described above, the heat-responsive-discoloring coloring composition of the present invention is characterized by having a discoloration initiation temperature (T) of 60° C. to 200° C. Because discoloration is irreversible at the discoloration initiation temperature (T) or higher, the heat-responsive-discoloring coloring composition is discolored when the temperature of the article coated with the heat-responsive-discoloring coloring composition is elevated to the discoloration initiation temperature (T) or higher, and even if it is then returned to a temperature lower than the discoloration initiation temperature (T), the article does not recover its color. In a case where the heat-responsive-discoloring coloring element is disposed near the article, too, the heat-responsive-discoloring coloring composition is irreversibly discolored when the temperature of the article becomes a certain level or higher. Accordingly, it is possible to detect the thermal history of an article by measuring the color concentration of the heat-responsive-discoloring coloring composition or element.

A method for measuring the color concentration is not particularly restrictive, and when high precision is needed, it is advantageous to measure a light absorption ratio of the maximum absorption wavelength in a visible wavelength range (400 nm to 700 nm).

The present invention will be specifically described below with reference to Examples without intention of restricting the scope of the present invention.

EXAMPLE 1

Preparation of Heat-responsive-discoloring Coloring Composition and Its Application for Printing (A) Preparation of Yellow Dye Composition 101(Y-101)

10 g of a leuco dye (L1), 4 g of stearyl alcohol, 10 g of a color-developing agent (SD-1), 10 g of a color image stabilizer (HP-1), and 300 g of a 20-%-by-mass aqueous dispersion of P-13 (copolymer of methyl methacrylate and 2-carboxyethyl acrylate at 95:5 having Tg of 100° C., average particle size:80 nm) were mixed in 200 ml of ethyl acetate. The resultant dispersion was mixed with 600 g of an aqueous solution containing 2.0 g of a surfactant (r), and emulsified by a dissolver stirrer at 10,000 rpm over 20 minutes. After emulsification, it was stirred in a nitrogen stream at 50° C. for 30 minutes to remove ethyl acetate, and distilled water was added thereto such that the total amount became 1,000 g, followed by mixing at 2,000 rpm for 10 minutes.

(B) Preparation of Magenta Dye Composition 101(M-101) and Cyan Dye Composition 101(C-101)

M-101 and C-101 were produced in the same manner as Y-101 except that a leuco dye (L1) was replaced by a leuco dye (L2) and a leuco dye (L3), respectively.

Leuco dye (L1)

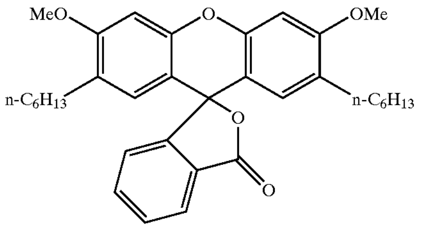

Leuco dye (L2)

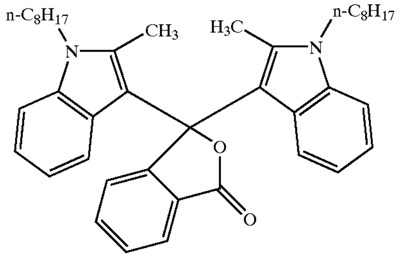

Leuco dye (L3)

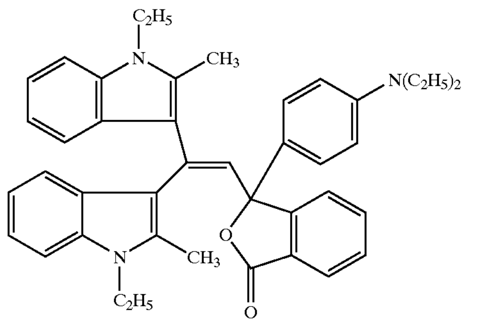

-continued

Color-developing agent (SD-1)

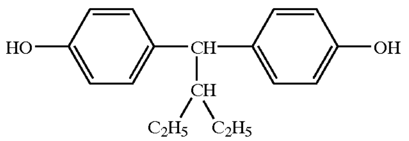

Color image stabilizer (HP-1)

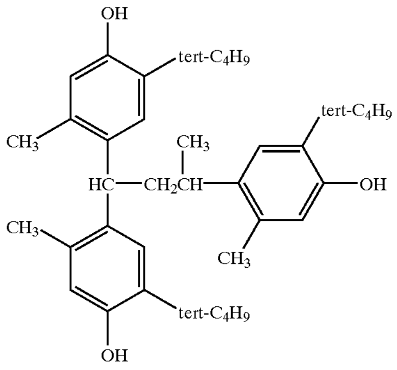

(C) Preparation and Evaluation of Ink 140 g of diethylene glycol, 50 g of glycerin, 7 g of SURFYNOL 465 available from Air Products and Chemicals, Inc., and 900 ml of deionized water were added to dye compositions Y-101, M-101 and C-101, respectively, to prepare a yellow ink, a light-magenta ink and a light-cyan ink. Each of these inks was charged into a cartridge in an inkjet printer PM670C available from Seiko Epson Corp., and image was printed on photo-printing papers available from Seiko Epson Corp. by this machine to obtain prints IJ-101. Each print IJ-101 was heated at 120° C. for 5 minutes in an electric oven. It was then returned to room temperature, finding that the image remained substantially completely disappeared. This indicates that using the heat-responsive-discoloring coloring composition of the present invention, printed image can be erased by simple heating, thereby making it possible to reuse papers for printing.

Comparative Example 1

Y-102, M-102 and C-102 were prepared in the same manner as in the preparation of Y-101, M-101 and C-101, except that the amount of stearyl alcohol added was changed to 20 g, and that a 20-%-by-mass aqueous dispersion of P-13 was not added. Using Y-102, M-102 and C-102, respectively, ink was prepared in the same manner as in Example 1, and image was printed on photo-printing papers by an inkjet printer PM670C. The resultant prints IJ-102 were heated at 120° C. for 5 minutes in an electric oven in the same manner as in the prints IJ-101 in Example 1. Though the image disappeared by heating, the image was substantially recovered in several minutes when returned to room temperature.

As described above in detail, when prints such as pictures and letters are made by an ink comprising the heat-responsive-discoloring coloring composition of the present invention, they can completely be erased by a simple heat treatment, thereby making printed papers reusable. The heat-responsive-discoloring coloring composition of the present invention and the heat-responsive-discoloring coloring element comprising such coloring composition can be used for temperature detection in various industries, for instance, the monitoring of temperature elevation in chemical reactions, etc., and for temperature marking and the detection of temperature history, etc. in electric circuits and electric appliances generating heat by overload. Thus, they are suitable for displays, advertising papers, textbooks, toys, etc.

What is claimed is:

1. A heat-responsive-discoloring coloring composition, which is colored at a temperature lower than its discoloration initiation temperature (T); which is substantially discolored at a temperature equal to or higher than said discoloration initiation temperature (T); and which does not recover its color once discolored, even when its temperature is lowered to a temperature lower than said discoloration initiation temperature (T) again, said discoloration initiation temperature (T) being 60° C. to 200° C., and said heat-responsive-discoloring coloring composition comprising a polymer having a glass transition temperature (Tg) of 60° C. to 200° C.

2. The heat-responsive-discoloring coloring composition according to claim 1, which further comprises an electron-donating, organic color former and an acidic compound.

3. The heat-responsive-discoloring coloring composition according to claim 2, wherein said acidic compound is a phenol compound.

4. The heat-responsive-discoloring coloring composition according to claim 1, wherein said polymer is in the form of dispersed particles having an average particle size of 0.01 μm to 1 μm.

5. The heat-responsive-discoloring coloring composition according to claim 1, which further comprises a hydrophilic binder.

6. A heat-responsive-discoloring coloring element comprising a substrate, and a heat-responsive-discoloring coloring layer coated on said substrate, said heat-responsive-discoloring coloring layer comprising a heat-responsive-discoloring coloring composition according to claim 1.

7. A method for detecting the thermal history of an article using a heat-responsive-discoloring coloring composition, said heat-responsive-discoloring coloring composition being colored at a temperature lower than its discoloration initiation temperature (T) and substantially discolored at a temperature equal to or higher than said discoloration initiation temperature (T), without recovering its color once discolored, even when its temperature is lowered to a temperature lower than said discoloration initiation temperature (T) again; said discoloration initiation temperature (T) being 60° C. to 200° C.; and said heat-responsive-discoloring coloring composition comprising a polymer having a glass transition temperature (Tg) of 60° C. to 200° C.; said method comprising the steps of applying said heat-responsive-discoloring coloring composition to said article, and measuring a color concentration of said heat-responsive-discoloring coloring composition to detect the thermal history of said article.

8. The method for detecting the thermal history of an article according to claim 7, wherein said heat-responsive-discoloring coloring composition comprises an electron-donating, organic color former and an acidic compound.

9. The method for detecting the thermal history of an article according to claim 8, wherein said acidic compound is a phenol compound.

10. The method for detecting the thermal history of an article according to claim 7, wherein said polymer is in the form of dispersed particles having an average particle size of 0.01 μm to 1 μm.

11. The method for detecting the thermal history of an article according to claim 7, wherein said heat-responsive-discoloring coloring composition comprises a hydrophilic binder.

12. A method for detecting the thermal history of an article using a heat-responsive-discoloring coloring element, said heat-responsive-discoloring coloring element having a substrate and a heat-responsive-discoloring coloring layer coated on said substrate; said heat-responsive-discoloring coloring layer comprising a heat-responsive-discoloring coloring composition according to claim 1; comprising the steps of positioning said heat-responsive-discoloring coloring element near said article, and measuring the color concentration of said heat-responsive-discoloring coloring composition to detect the thermal history of said article.

* * * * *